United States Patent
Gaylord

[15] 3,692,262
[45] Sept. 19, 1972

[54] PARACHUTE HARNESS AND SINGLE POINT RELEASE

[72] Inventor: John A. Gaylord, Greenbrae, Calif.
[73] Assignee: H. Koch & Sons, Inc., Corte Madera, Calif.
[22] Filed: Dec. 11, 1970
[21] Appl. No.: 97,250

[52] U.S. Cl. ............................................244/151 A
[51] Int. Cl. ...............................................B64d 17/32
[58] Field of Search..........255/151 R, 151 A, 151 B; 24/73 PH

[56] References Cited

UNITED STATES PATENTS

| 1,899,656 | 2/1933 | Wigley et al. | 244/151 R |
| 2,986,362 | 5/1961 | Gimalouski | 244/151 A |
| 2,989,274 | 6/1961 | Moran | 244/151 A |
| 2,405,671 | 8/1946 | Quilter et al. | 244/151 R |
| 2,527,972 | 10/1950 | Taunty | 244/151 R |

Primary Examiner—Milton Buchler
Assistant Examiner—Carl A. Rutledge
Attorney—George B. White

[57] ABSTRACT

A parachute harness in which all the straps and belts are connected to a single release, and the leg straps are so connected to the lap belts as to provide a single releasable connection for each leg strap and lap belt releasably connected to one another; the single release is detachably connected to one of the straps.

4 Claims, 11 Drawing Figures

INVENTOR
JOHN A. GAYLORD

ATTORNEY

PATENTED SEP 19 1972

INVENTOR
JOHN A. GAYLORD

ATTORNEY

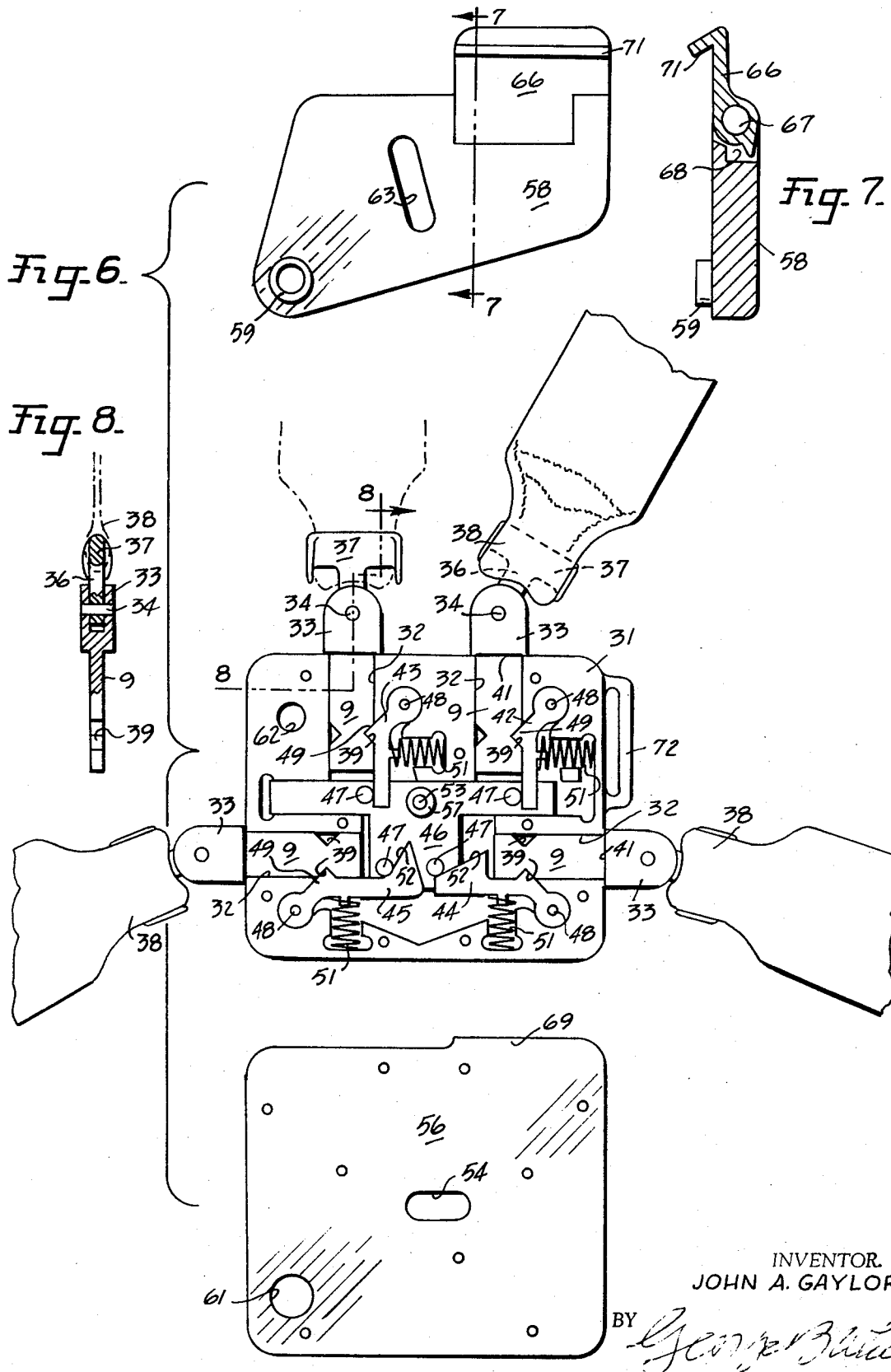

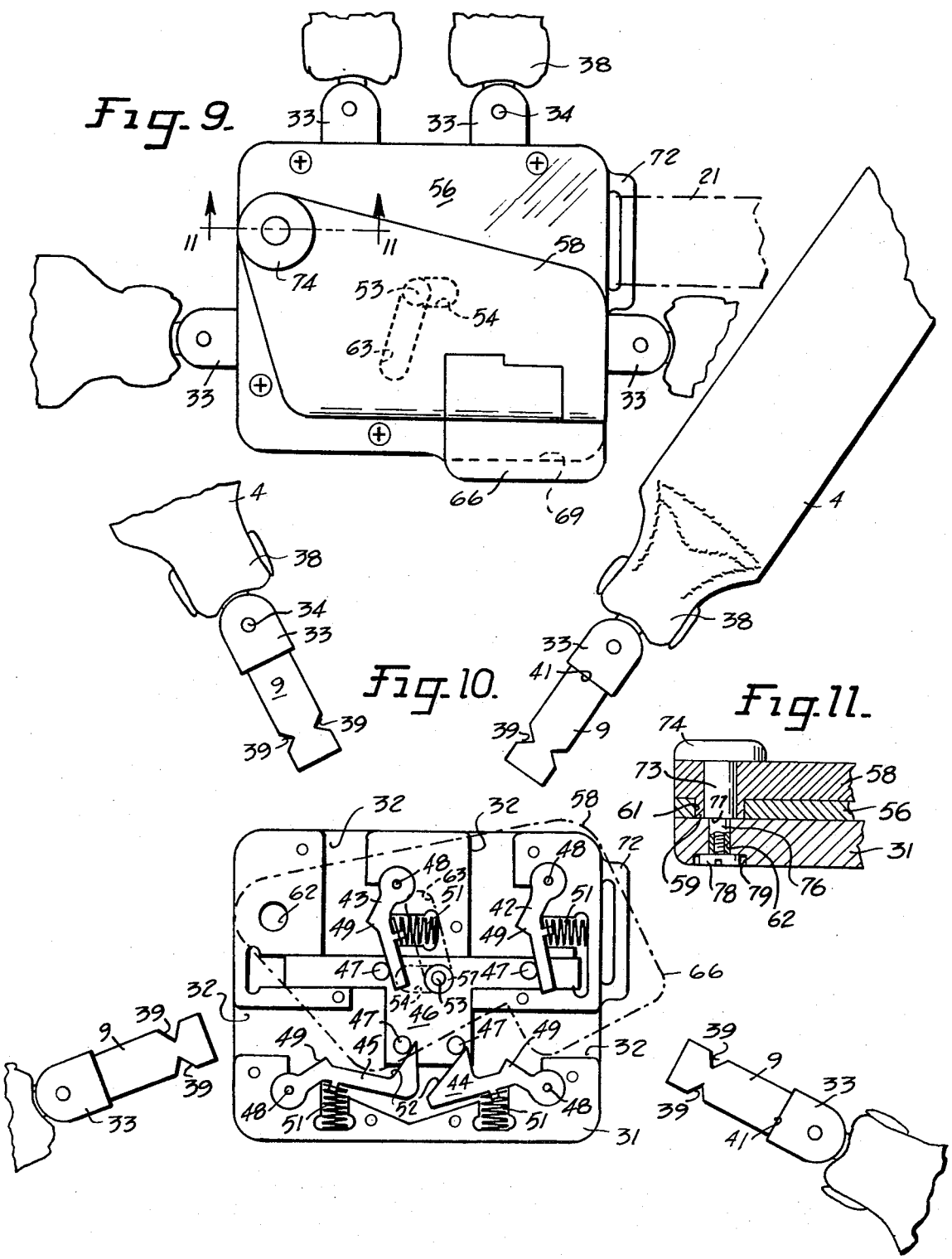

PARACHUTE HARNESS AND SINGLE POINT RELEASE

BACKGROUND OF THE INVENTION

This invention is an improvement on the co-pending application on Single Release for Parachute Harness, Ser. No. 887,929, filed on Dec. 24, 1969. Improvements on parachute harness and their connection to a single point manipulable release are of great importance because aircraft personnel must be able to fee themselves from the harness by quick and easy manipulation. Therefore the present invention is also an improvement on the type of single point release shown in U.S. Pat. No. 3,556,565 on Multiple Web Connector and Single Point Release, issued Jan. 19, 1972, and the single release shown in the co-pending application of Seat Restraint and Single Release For the Same, Ser. No. 31,526, filed on Apr. 24, 1970.

The primary object of the present invention is to reduce the number of straps that are connected to the single release by inter-connection of at least two of the straps on each side in such a manner that there is only one of such inter-connected straps connected to the single release but upon release the inter-connected straps separate by themselves.

Another feature of the invention is to provide a single point release which is fully protected against accidental release, yet can quickly release the connected straps by simple manipulation.

DESCRIPTION OF FIGURES

FIG. 6 is a developed view of the single point release.

FIG. 7 is a sectional view of the release handle, the section being taken on lines 7—7 of FIG. 6.

FIG. 8 is a sectional view of one of the connector plugs, the section being taken on lines 8—8 of FIG. 6.

FIG. 9 is a face view of the single point release with the connector plugs plugged into the release.

FIG. 10 is a view of the single point release with the cover removed and the connector plugs released.

FIG. 11 is a fragmental view showing the handle pivot fastening.

DETAILED DESCRIPTION

Figure 3:
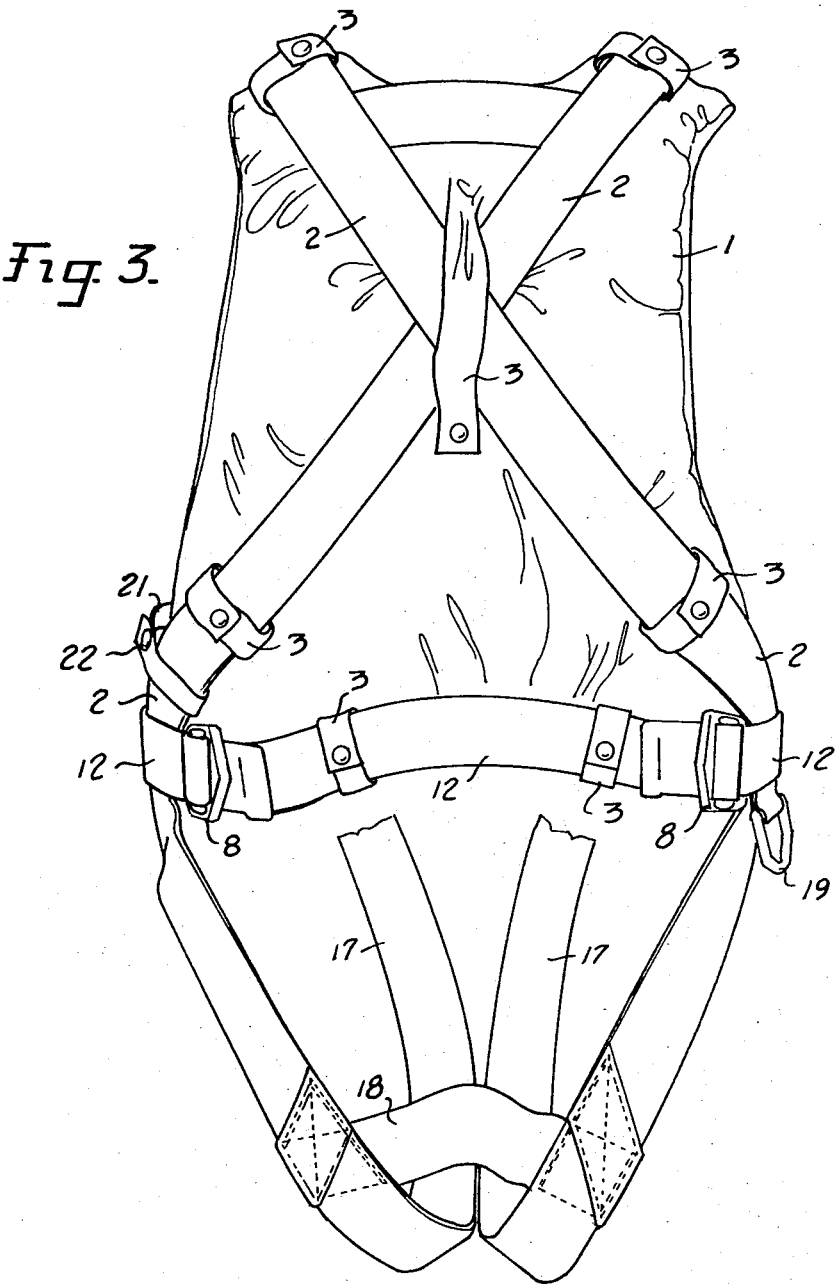
FIG. 3 is a rear view of the harness.

The harness includes a back pad 1 on which are suitably secured back straps 2. In the present illustration as shown in FIG. 3, the back straps 2 cross one another at about the middle of the back pad 1 and are held in place by suitable snap flaps 3.

A shoulder strap 4 is connected to the top of each back strap 2 by a buckle 6 which has a suitable device such as a cross bar 7 to which can be connected in the usual manner a shroud of a parachute not shown. Each shoulder strap 4 also has in it a usual adjusting buckle 8 whereby the length of the shoulder strap can be adjusted in the usual manner to suit the person. At the free end of each shoulder strap 4 is a connector plug 9 adapted to be plugged into the single point release 11.

Figure 1:
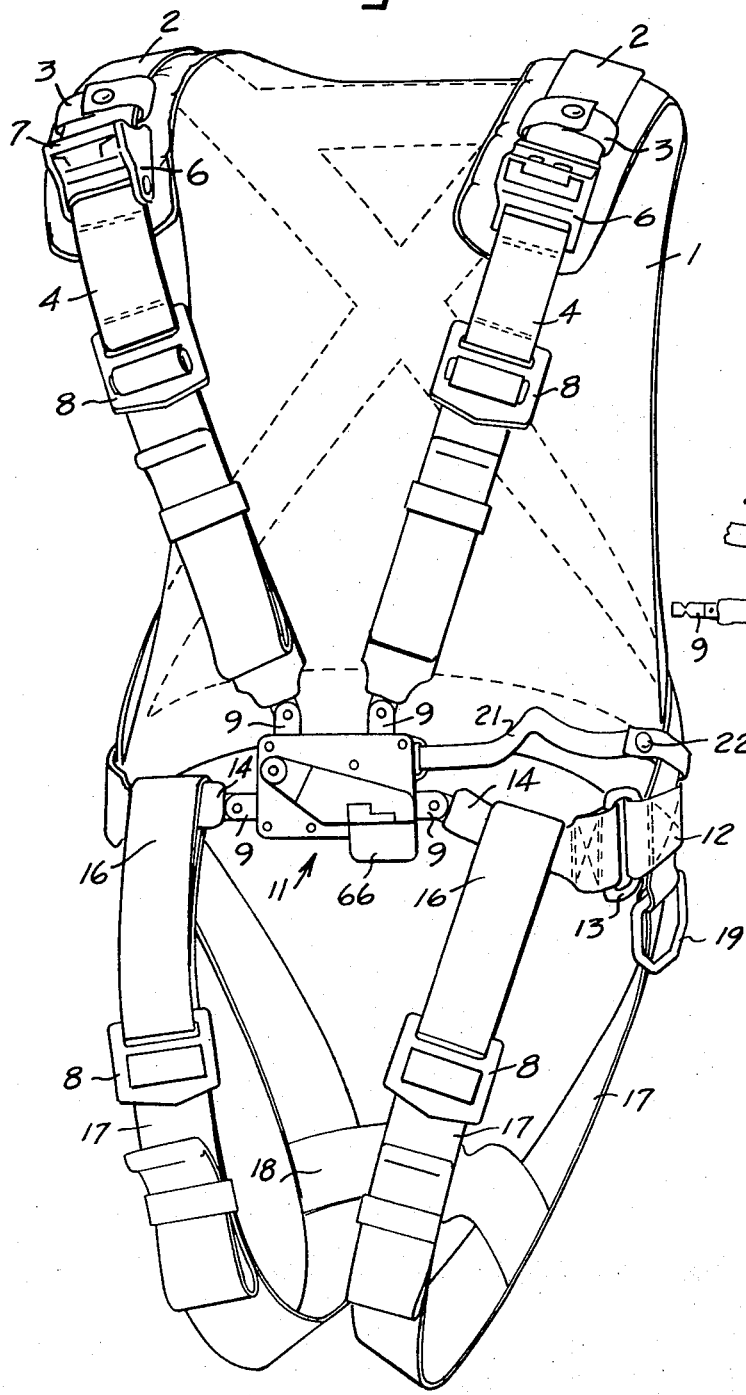
FIG. 1 is a perspective view of the arrangement of straps in the harness connected to the single point release.
Figure 2:
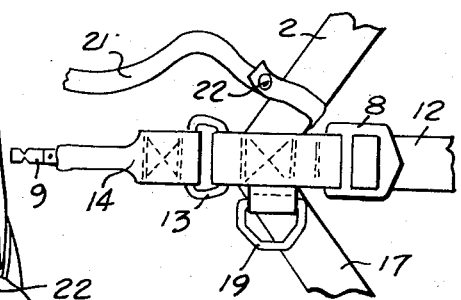
FIG. 2 is a fragmental view of the connection between the leg straps and the adjacent back strap and leg belt.

To the lower end of each back strap 2 is fixedly connected an end of a waist belt 12 which has an adjusting buckle 8 interconnected therein. On a ring 13 at the front end of the waist belt 12 is secured a lap belt 14 provided at its free end with a connector 9 to the single point release 11. A portion of the lap belt 14 is narrower than the waist belt 12 so that it can be drawn through a loop 16 on the free end of a leg belt 17. An adjusting buckle 8 in inter-connected in each leg belt 17. The other end of each leg belt 17 is fixedly connected to the lower end of the adjacent back strap 2. The portions of the leg belts 17 extending toward the back of the leg, nearer the back straps 2, are connected by a cross belt 18. There is a ring 19 secured to the lower end of each back strap 2 at the joint with the waist belt 12 as shown in FIGS. 1 and 2 to accommodate other strap connections.

The aforesaid arrangement of the harness reduces the number of connections to the single point release 11 to only four connector plugs 9 whereby both the connection and release is greatly facilitated and accelerated. The single point release 11 is supported by a hanging strap 21 and a suitable snap connection 22 to one of the back straps 2.

Figure 4:
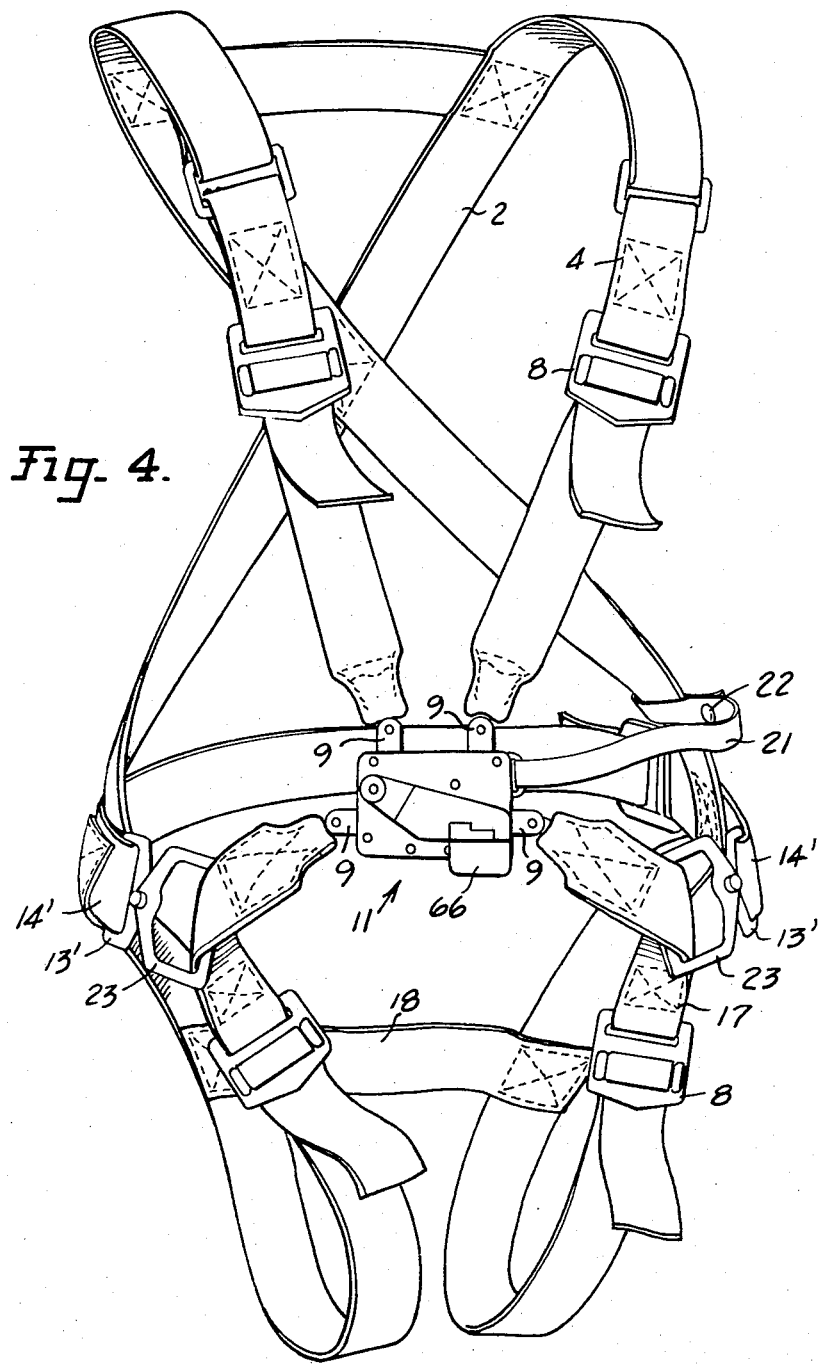
FIG. 4 is a modified form of arrangement of straps of the harness.
Figure 5:
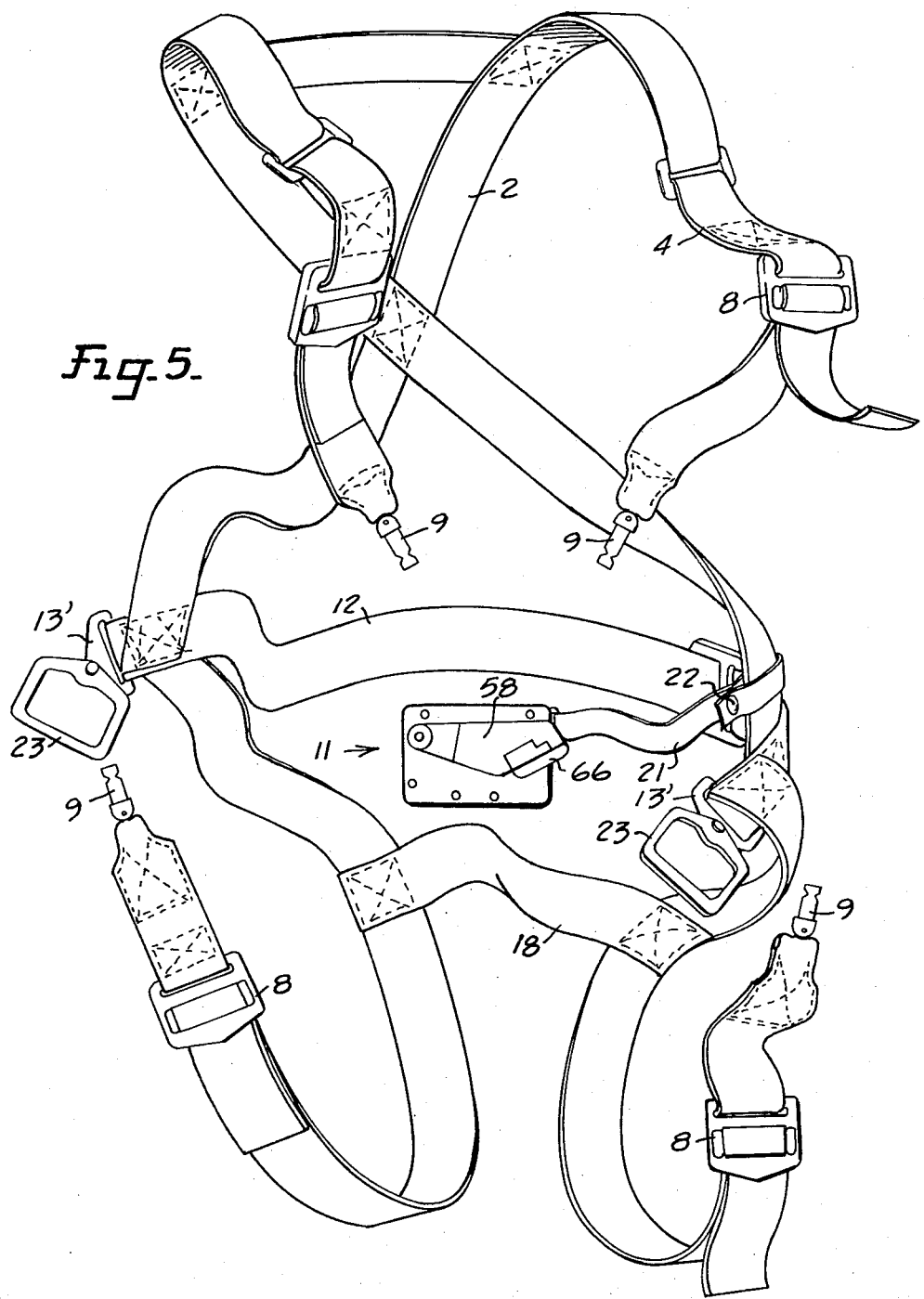
FIG. 5 shows the harness released.

In the form shown in FIGS. 4 and 5, the lap strap 14' is shorter and its ring 13' is pivotally connected to a second ring 23, and the free end of the adjacent leg belt 17 is threaded through the pivoted ring 23 and the connector plug 9 is on the free end of the leg belt 17 as shown in FIG. 4.

The released position of the harness illustrated in FIG. 5 generally illustrates the quick release of both forms of the harness.

THE SINGLE POINT RELEASE

The single point release 11 includes a bottom plate 31 provided with a plurality of sockets 32 which fit the connector plugs 9. Each connector plug 9 has a forked head 33 which is connected by a pivot pin 34 to the center portion 36 of a cross head 37 adapted to be fixed into a loop 38 in the end of the respective strap or belt.

Each plug 9 is flat as shown in FIG. 8 and has an angular notch 39 in each edge thereof. The notches 39 on the opposite edges are directly opposite one another, namely, are spaced the same distance from the abutment shoulder 41 of the forked head 33.

The middle portion of the bottom plate 31 is recessed so as to accommodate four pawls, 42, 43, 44 and 45, and also to provide guiding for an actuating slide 46. On the actuating slide are actuating buttons 47 related to the respective pawls in a manner to be hereinafter described so that when the actuating slide is shifted from the position shown in FIG. 6 into the position shown in FIG. 10, the respective buttons move the respective pawls out of the respective notches 39 for simultaneously releasing all four plugs 9.

In the present form the sockets 32 for the pawls 42 and 43 extend from the adjacent side of the bottom plate 31 parallel with one another. The other two sockets 32 adjacent the pawls 44 and 45 extend from opposite ends of the bottom plate 31 toward one another. Accordingly, pawls 42 and 43 are pivoted on pivots 48 so that each pawl 42 and 43 extends alongside one side of the adjacent socket 32, as shown in the top portion of the bottom plate in FIG. 6. Each pawl 42 and 43 has an angular prong 49 on one edge spaced from its pivot 48 so as to be located at the same distance from the upper edge or side of the bottom plate 31 as the distance between the keeper notch 39 and the abutment shoulder 41 of the connecting plug 9. A coil spring 51 in a suitable pocket in the base plate 31 presses each pawl 42 or 43 into engagement with the adjacent connector plug 9 as shown in FIG. 6.

The pawls 44 and 45 are also pivoted around the pivots 48 so that their respective prongs 49 engage with the notches 39 of the adjacent plugs 9, and are moveable in a suitable pocket in the bottom plate 31. A spring 51 presses each prong 44 and 45 respectively into engagement with the adjacent plug 9. Each pawl 42 and 43 extends over the actuating slide 46 and a button 47 is in engagement with each pawl 42 and 43 so that when the actuating slide 46 is shifter to the right, viewing FIG. 6, the buttons 47 will push the pawls 42 and 43 against the action of the springs 51 for disengaging them from the respective notches 39. Each pawl 44 and 45 has on its free end an enlarged head with an inclined face 52 extending over an adjacent portion of the actuator slide 46. A button 47 extends adjacent the lower end of each inclined face 52 so that as the actuator slide 46 is shifted to the right, viewing FIG. 6, the respective buttons 47, riding on the respective inclined faces 52, push the respective pawls 44 and 45 against the action of the springs 51 away from the respective connector plugs 9 into the releasing position shown in FIG. 10.

The shifting of the actuating slide 46 is accomplished through a finger 53 extended upwardly from about the middle of the horizontal portion of the actuating slide 46 through a slot 54 in the cover plate 56 secured over the bottom plate 31 so as to cover the aforedescribed movable parts. The slot 54 is parallel with the upper portion of the actuating slide 46 viewing FIG. 6, so as to accommodate the reciprocation of the finger 53 from the position shown in FIG. 6 into the position shown in FIG. 10 and vice versa. The finger 53 has a roller 57 thereon to facilitate manipulation.

The manipulation is accomplished through a handle 58 which in this illustration is pivoted by a pivot 59 in a socket 61 in the cover plate 56 and in a hole 62 in the bottom plate 31. In the face of the handle 58 overlying the top plate 56 is a slot 63 which is so located as to receive the top end of the finger 53 in the position shown in broken lines in FIG. 9. The slot 63 is slanted so that the axis of the slot extends at an angle away from the adjacent end of the cover plate slot 54, whereby when the handle 58 is turned in a contraclockwise direction viewing FIG. 9, the finger 53 is shifted to the right viewing FIG. 9 in the cover plate slot 54 and thereby the actuating slide 46 is shifted from the position shown in FIG. 6 into the position shown in FIG. 10 for instantaneous release of all connector plugs 9 in the manner heretofore described.

In order to prevent accidental turning of the handle 58, a catch flap 66 is pivoted on a pivot 67 in a pocket 68 adjacent the free end of the handle 58 so that the flap 66 can be swung away from the adjacent edge of the cover plate 56. The cover plate 56 has a keeper flange 69 projecting beyond the adjacent side of the bottom plate 31, and the catch flap 66 has a hook flange 71 on its free end adapted to be snapped under the keeper flange 69 in the position shown in FIG. 9 thereby to prevent the turning of the handle 58 until and unless the catch flap 66 is lifted to be disengaged from the keeper flange 69. The bottom plate 31 has a loop 72 on one end thereof and said hanging strap 21 is connected to said loop 72.

The pivot 59 of the handle 58 is held in place by a suitable pivot pin such as a pivot shank 73 which fits into the tubular pivot 59 and has a suitable head 74 engaging the top surface of the handle 58.

A reduced end 76 extends from the shoulder 77 of the pivot shank 73 and a suitable set screw 78 is threaded into the bottom of the extension 76 to bear against the bottom of a recess 79 in the bottom of the bottom plate 31. In this manner the clearance for the turning movement of the pivot 59 is accurately determined.

I claim:

1. In combination with a single point release, a parachute harness having
    a pair of shoulder straps
    opposite lap straps,
    leg belts,
    means to connect each of said straps and belts to said single point release, and
    manipulable mechanism to release all of said connections from said single point release simultaneously,
    each of said connecting means including a plug having at least one keeper notch therein,
    said single point release including
    a body having sockets accessible from the outside and corresponding to said plugs,
    a pawl pivoted adjacent each socket,
    a projection on each pawl interlocking with said keeper notch of the adjacent plug,
    a sliding element in said body,
    resiliently yieldable means to urge said pawls to interlock said projection with said notches,
    actuating projections on said sliding element adjacent the respective pawls and engageable with the respective pawls to move said pawls out of engagement from the respective keeper notches when said element is shifted in said body in one direction and to permit said pawls to reengage said plugs upon the returning of said shifting element into its initial position,
    said manipulating means including
    a handle pivoted on the outside of said body, and
    connecting means between the handle and said element for converting the pivotal movement of said handle into reciprocating movement of said actuating element.

2. The invention specified in claim 1, and
    said sliding element being a plate, and
    said resiliently yieldable means being a spring in each socket adjacent each pawl biased to urge said pawl into engagement with the adjacent plug.

3. The invention specified in claim 2, and
    a cover plate on said body,
    a keeper flange projecting from said cover plate beyond the side of said body,
    a locking flap pivoted on said handle, a hook on said locking flange adapted to be snapped over said keeper flange to hold said handle in plug locking position.

4. The invention specified in claim 2, and each plug having a head forming a shoulder engageable with the adjacent side of said body to locate the respective notches in registry with the respective projections on said pawls, pivoted attachment element on each head for connection to the respective straps.

* * * * *